United States Patent [19]
Wartenbergh

[11] Patent Number: 4,502,598
[45] Date of Patent: Mar. 5, 1985

[54] HOLDER FOR MAGNETIC DISKS

[75] Inventor: Robert P. Wartenbergh, Woodside, Calif.

[73] Assignee: Dysan Corporation, Calif.

[21] Appl. No.: 323,647

[22] Filed: Nov. 20, 1981

[51] Int. Cl.³ ............................................ B65D 85/02
[52] U.S. Cl. ..................................... 206/444; 206/445;
211/59.4; 292/251; 360/133; 411/418
[58] Field of Search ............... 206/307, 309, 310, 403,
206/404, 405, 444, 445, 449; 211/49 R, 49 S;
292/251; 360/133; 411/418, 431; 150/55

[56] References Cited
U.S. PATENT DOCUMENTS

| | | | |
|---|---|---|---|
| 1,365,659 | 1/1921 | Carter | 206/408 |
| 3,315,840 | 4/1967 | Tollkuhn | 360/133 |
| 3,378,183 | 4/1968 | Ferrer | 211/49 R |
| 3,465,875 | 9/1969 | McKelvey, Jr. | 360/133 |
| 3,509,992 | 5/1970 | David et al. | 206/444 |
| 3,543,922 | 12/1970 | Charlton | 206/444 |
| 3,709,397 | 1/1973 | Daenen | 150/55 |
| 3,736,777 | 6/1973 | Wirth | 312/10 |
| 4,195,733 | 4/1980 | Abel | 206/444 |

FOREIGN PATENT DOCUMENTS 2328152 12/1974 Fed. Rep. of Germany ...... 411/418

Primary Examiner—George E. Lowrance
Assistant Examiner—Jimmy F. Foster
Attorney, Agent, or Firm—Townsend and Townsend

[57] ABSTRACT

A holder for removably receiving a plurality of magnetic memory disks and for holding the disks in a vertical stack. The holder includes a base having a center post secured thereto and extending upwardly therefrom. The post is adapted to receive the magnetic disks thereon with the disks being arranged on the posts in generally parallel, horizontal planes and separated from each other by ring-like spacers. A nut is removably mounted on the post for locking the disks in place. The nut has a number of spaced projections on its inner periphery for engagement with spaced, circumferentially extending screw thread segments on the outer surface of the post. The segments are spaced from each other to present recesses for receiving the projections on the nut when the nut is first placed on and moved axially along the post until the nut rests on the uppermost spacer. By rotating the nut through a finite angle, such as 30° to 95°, the projections on the nut are threaded onto the screw thread segments on the post and the nut becomes locked on the post to thereby lock the disks against movement relative to the post. A cover is placed over the disks on the post and secured to the post by a screw carried by the cover. The outer peripheries of the base and cover have projections which engage each other when the cover is secured on the post. One of these projections is flexible so that it yields outwardly when it engages the other projection yet the projections remain in contact with each other to provide an annular seal for the holder when the cover is in place.

5 Claims, 8 Drawing Figures

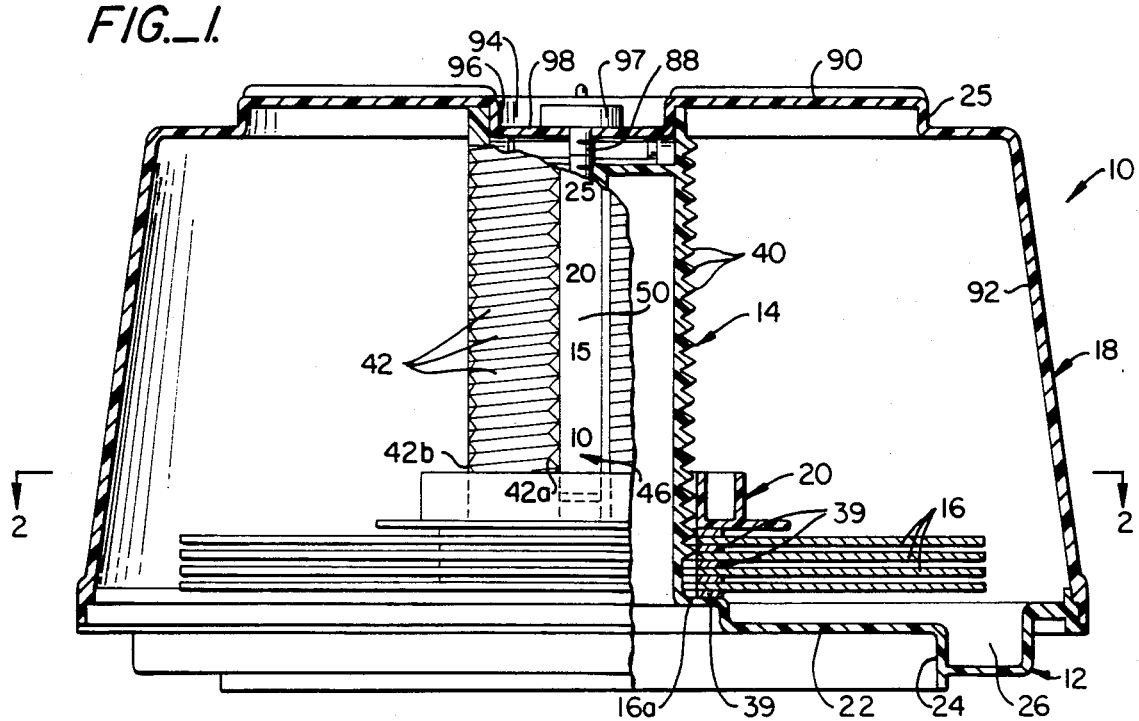
FIG._1.
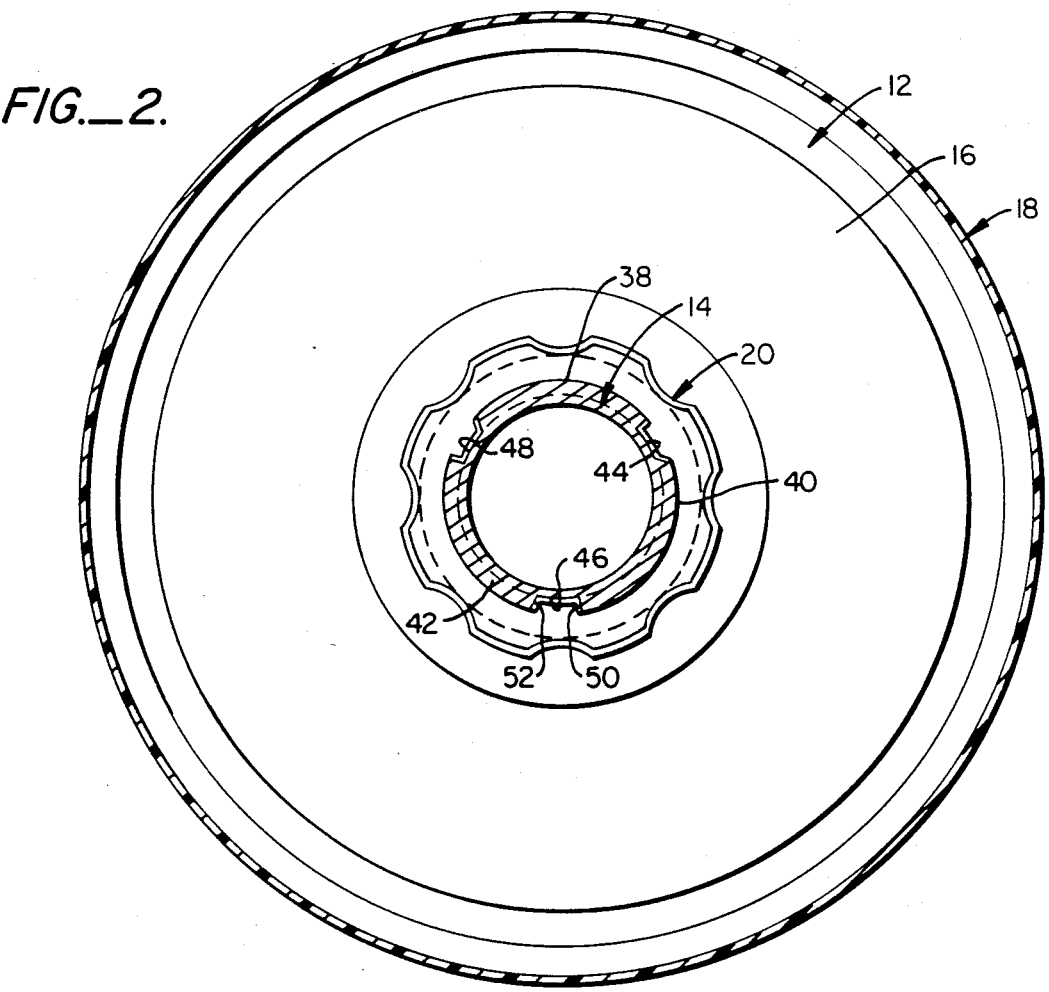
FIG._2.

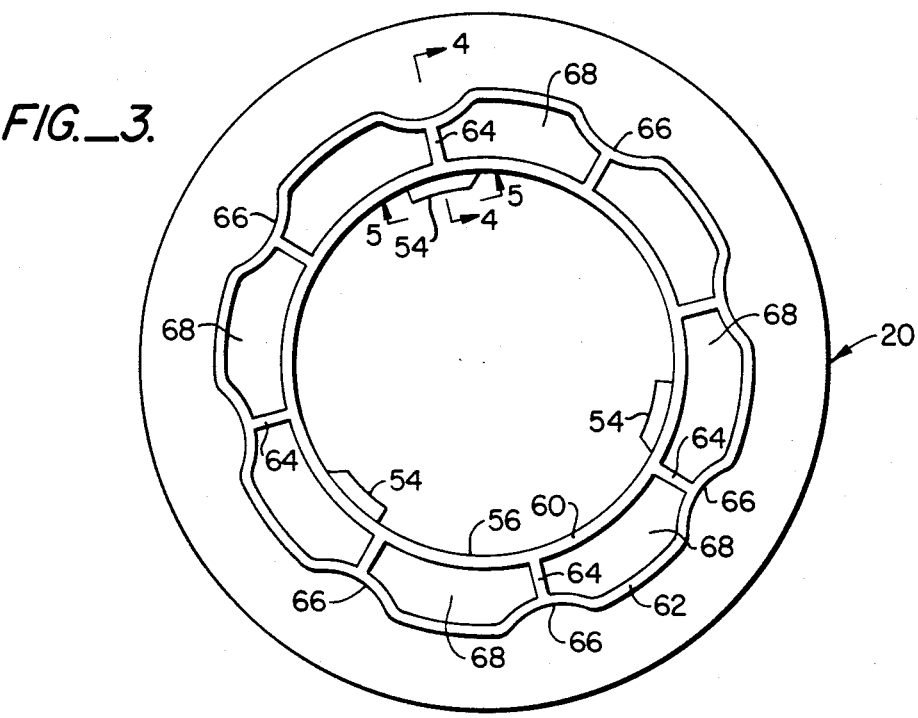
FIG._3.
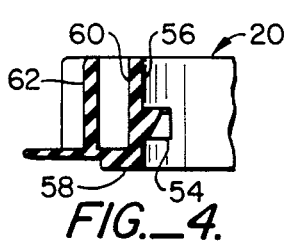
FIG._4.
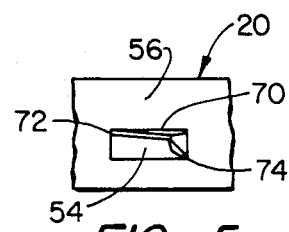
FIG._5.
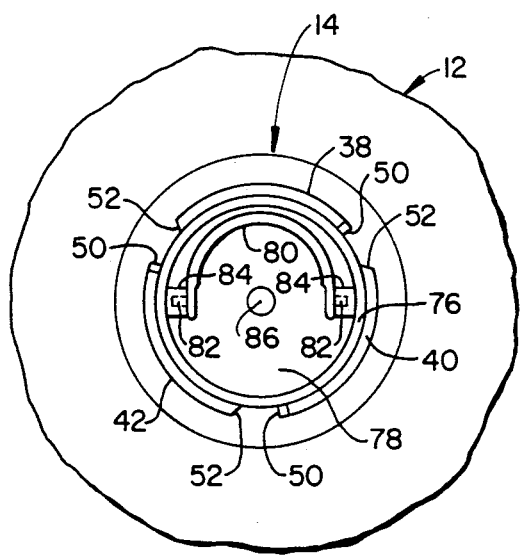
FIG._6.

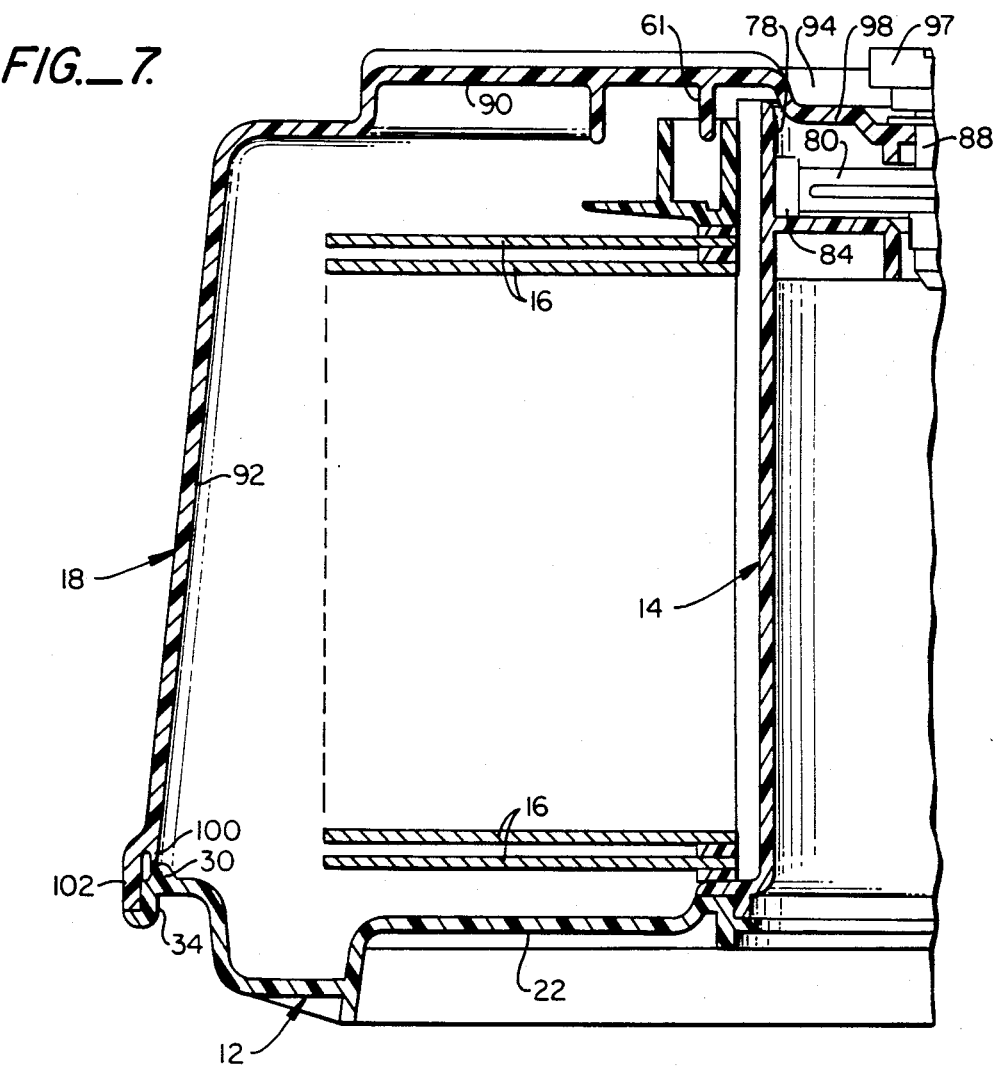
FIG._7.
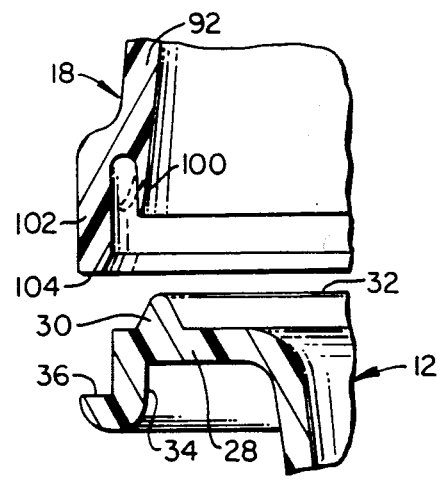
FIG._8.

HOLDER FOR MAGNETIC DISKS

This invention relates to the protection of a plurality of magnetic disks when the same are to be moved from place to place or to be stored and, more particularly, to an improved holder for a plurality of magnetic disks.

BACKGROUND OF THE INVENTION

When rigid magnetic disks are moved from one location to another, they must be protected against contact with other structures and from adjacent disks. Holders of different configurations have been used in the past to support a number of rigid magnetic disks in vertically stacked relationship to each other.

Generally, conventional holders for magnetic disks have one or more drawbacks. One of the drawbacks is the lack of a proper hold-down means for the disks to prevent them from contacting each other and causing them to become damaged. Another drawback is the lack of an adequate seal between the cover of the holder and the base on which a stack of disks are placed to keep the region containing the disks free of dirt or other foreign matter from the atmosphere.

Because of the foregoing drawbacks, a need has arisen for an improved holder for magnetic disks which avoids the problems associated with conventional holders.

SUMMARY OF THE INVENTION

The present invention satisfies the aforesaid need by providing an improved holder for a group of rigid magnetic disks which are mounted in vertically stacked relationship to each other. The holder of the present invention includes a base having a center post for receiving a plurality of such disks with the disks being spaced apart from each other by plastic spacers and the disks being in generally parallel, horizontal planes to form the stack.

The post removably receives a nut thereon which bears against the uppermost spacer. The nut has a group of spaced projections on its inner periphery which engage spaced, screw thread segments on the outer surface of the post to cause a locking of the nut on the post after the nut has been moved axially along the post to the uppermost disk and then rotated on the post through a finite angle, such as an angle of 30° to 95°. With the nut locked in place, the disks are held against movement relative to the post.

A main feature of the invention is that locking of the nut can be quickly achieved even though the nut is rotated only through a small angle on the post rather than threaded completely on the post from the upper end to the location where it engages the uppermost disk or spacer. The improved locking means of the present invention, therefore, speeds up the task of locking the disk in place and the nut can be quickly and easily placed on and taken off the post to minimize the time required to lock the disks on the post.

Another feature of the present invention is the improved seal at the outer periphery of the holder at the location where the cover of the holder engages the base of the holder when the cover is in covering relationship to the disks on the post. To this end, both the base and cover have respective annular, outer peripheral projections which engage each other when the cover moves in place onto the base. One of the projections is flexible so that it yields relative to the other projection yet the projection remains in contact with the other projection. Thus, the yieldable projection is biased against the other projection to form a positive, annular seal having a long useful operating life.

The primary object of the present invention is to provide an improved holder for rigid magnetic disks in which the disks can be quickly and easily locked in place on a vertical post in the holder yet the space in the holder containing the magnetic disks remains closed to the atmosphere to thereby insure the integrity of the disks during the time the holder is being shipped from place to place or is stored for future use.

Another object of the present invention is to provide an improved holder for magnetic disks of the type described wherein the holder has a center post mounted on a base for receiving a plurality of stacked, magnetic disks and the post has spaced, screw-thread segments thereon which mate with screw-thread projections on a nut shiftably mounted on the post so that the nut can be moved axially along the post until the uppermost disk is reached, then the nut is rotated through a relatively small angle to lock the nut and thereby the disks on the post in a quick and efficient manner.

Another object of the present invention is to provide an improved holder for rigid magnetic disks wherein the holder has a cover removably mounted on a base and engageable therewith at the outer periphery of the base so that a pair of annular projections on the base and cover, respectively, can engage each other to form an improved seal as one of the projections yields relative to the other projection as the projections remain in contact with each other.

Other objects of this invention will become apparent as the following specification progresses, reference being had to the accompanying drawings for an illustration of the invention.

IN THE DRAWINGS

FIG. 1 is a vertical section through the holder for magnetic disks of the present invention;

FIG. 2 is a cross-sectional view taken along line 2—2 of FIG. 1;

FIG. 3 is an enlarged, top plan view of the nut for attachment to the post of the holder for retaining magnetic disks on the post;

FIG. 4 is a fragmentary, cross-sectional view taken along line 4—4 of FIG. 3;

FIG. 5 is a fragmentary, side elevational view taken along line 5—5 of FIG. 3;

FIG. 6 is a fragmentary top plan view of the holder and showing the top of the post;

FIG. 7 is a view similar to FIG. 1 but showing the seal at the junction of the outer peripheries of the base and cover of the holder; and FIG. 8 is an enlarged, fragmentary cross-sectional view of the seal with the cover slightly separated from the base.

The holder for magnetic disks of the present invention is broadly denoted by the numeral 10 and includes a base 12 (FIGS. 1 and 2), an upright post 14 for mounting a plurality of magnetic disks 16 in stacked relationship on base 12, and a cover 18 for covering the disks in the manner shown in FIG. 1 after the disks have been mounted on post 14. A nut 20 is removably carried on post 14 for securing the disks 16 in place to prevent movement of the disks relative to post 14.

Base 12 is generally circular in configuration as shown in FIG. 2 and includes a bottom wall 22 having an annular skirt 24 depending therefrom. The lower margin of skirt 24 is adapted to be supported on a surface therebelow.

Base 12 has an annular recess 26 thereon radially outwardly of skirt 24. Recess 26 is formed in the base to provide strength for the base and skirt 24 presents a recess to receive an annular flange 25 on cover 18 of an adjacent holder 10. Recess 26 presents an annular extension 28 (FIG. 8) provided with an annular projection 30 thereon. Projection 30 extends upwardly from extension 28 and has convergent sides as the upper margin 32 of the projection is approached. Extension 28 has an annular flange 34 at its outer periphery, flange 34 having an annular, flat, upwardly facing surface 36 near the outer lower end thereof. The purposes of projection 30 and surface 36 will be described with reference to a seal formed with certain components on cover 18 when the cover is placed in an operative position on base 12 in covering relationship to disks 16.

Post 14 is shown as being integral with bottom wall 22 as shown in FIG. 1. In the alternative, the post can be initially separate from the base and secured thereto by suitable fastening means, such as welding or an adhesive, as shown in FIG. 7. Post 14 has an outer diameter of a size permitting a plurality of disks 16 to be stacked on the post in the manner shown in FIG. 1, each disk having a central hole 16a (FIG. 1) which is slightly larger than the maximum diameter of the post so that the disk can be freely placed on and taken off the post. A ring-like spacer 39, preferably of plastic is placed between each pair of adjacent disks 16 and below the lowest disk and above the uppermost disk to keep them spaced apart and out of contact with each other and with adjacent structure.

Post 14 has three sets of segments, 38, 40 and 42 defining right-hand, screw threads, each of the screw segments having a configuration of the type shown in FIG. 1. The segments of each set are vertically spaced along post 14 from a location near the lower end of the post to a location near the upper end thereof. The screw-threaded segments 38, 40 and 42 are equal in number and are at corresponding levels on post 14, i.e., there being a segment 38 for each segment 40 and each segment 42, respectively.

Segments 38 and 40 are separated by a recess 44 (FIG. 2); segments 40 and 42 are separated by a recess 46; and segments 42 and 38 are separated by a recess 48. Each of the three recesses 44, 46 and 48 has a radial surface 50 and an inclined surface 52 (FIG. 2). These recesses are adapted to receive three projections 54 (FIGS. 3-5) secured to the inner surface 56 of nut 20 for the purpose of mounting the nut on post 14 above the disks 16 on the post.

Each of the segments 38, 40 and 42 spirals slightly downwardly from its upstream recess as it extends in a clockwise sense when viewing FIG. 2. The upstream recess for segments 38 is recess 48; the upstream recess for segments 40 is recess 44; and the upstream recess for segments 42 is recess 46. As shown in FIG. 1, for instance, recess 46 is adjacent to the upper ends 42a of screw segments 42. The lower ends 42b of each screw segment 42 is circumferentially spaced from the corresponding recess 46 and at a height below the height of the corresponding upper end 42a.

As shown in FIG. 1, the vertically extending surface portions 50 defining each of the recesses 44, 46 and 48 has indicia thereon to indicate the number of magnetic disks 16 that can be accommodated on the post. These indicia can be omitted if desired.

Nut 20 is formed in a one-piece construction in the manner shown in FIGS. 3-5. Nut 20 has three projections 54 on the inner periphery 56 thereof for placement in recesses 44, 46, and 40, whereby the nut can freely move up and down the post. Thus, when one or more disks 16 are on the post, nut 14 can be placed on the post and allowed to move downwardly until the lower surface 58 (FIG. 4) of nut 20 engages the upper spacer 39 as shown in FIG. 7. Then, nut 20 is rotated clockwise when viewing FIG. 2 through an angle of about 90° to 100° whereupon projections 54 will move beneath corresponding segments 38, 40 and 42 in a screw threaded fashion to lock nut 20 on the post 14. The locking action occurs because segments 38, 40 and 42 spiral downwardly as they extend circumferentially in a clockwise sense (viewing FIG. 2) away from their respective recesses 48, 44, and 46. When the nut is locked in place, disks 16 are prevented from moving relative to post 14; thus, the disks are essentially well protected and are kept out of engagement with each other.

Nut 20 has a first, ring 60 provided with inner periphery 56. A second, outer ring 62 of nut 20 is connected by webs 64 to ring 60, ring 62 having concave recesses 66 in alignment with webs 64. The spacing between rings 60 and 62 define recesses 68 extending about ring 60 as shown in FIG. 3. Certain of the recesses 68 can receive a pair of projections 1 (FIG. 7) on cover 18 to effectively prevent rotation of the nut on the post 14 when the post has a full stack of disks (usually 25) and when cover 18 is in place as shown in FIGS. 1 and 7.

Each projection 54 has an innermost marginal edge 70 which extends from an upper point 72 on the projection to a lower point 74 (FIG. 5). Thus, marginal edge 70 will underlie a particular segment, 38, 40 or 42 and being in sliding engagement with the segment as nut 20 is rotated through an angle typically less than 120° to lock the nut in place. Generally, each projection 54 is triangular in cross-section as shown in FIG. 5 and is an American Standard Buttress thread (ASA B1. 9-1953) in plan form as shown in FIG. 3.

Post 14 has an upper marginal edge 76 (FIG. 6) which surrounds a recess 78 having a depth of approximately ½-inch. In the recess is a semicircular handle 80 pivotally secured by pins 82 to a pair of ears 84 integral with post 14 near the upper end thereof.

Handle 80 can pivot from a horizontal, stored position as shown in FIG. 6 into a vertical position. In the vertical position, the handle can be grasped and lifted to thereby permit the holder portion comprised of base 12 and post 14 to be carried from place to place with or without disks 16 mounted on the post. Also, the post has a central, threaded hole 86 extending thereinto for receiving a screw 88 (FIG. 1) carried on cover 18.

Cover 18 generally is of a transparent, plastic material and includes a top wall 90 and a side wall 92 integral with top wall 90 as shown in FIG. 1. Top wall 90 has a central recess 94 which defines an annular flange 96 receivable in the upper, open end of post 14 when cover 18 is on base 12. Screw 88 has a head 97 which is supported on the bottom wall 98 defining recess 94 when cover 18 is removed from base 12. When the cover is in place on the base as shown in FIG. 1, screw 88 is threaded into hole 86 by rotating head 97 in a clockwise sense when viewing FIG. 6.

Side wall 92 flares outwardly and downwardly away from top wall 90. The lower marginal edge of side wall 92 has a cross-section of the type shown in FIG. 8. To this end, side wall 92 has an inner, yieldable or flexible annular projection 100 spaced inwardly from an annular flange 102 having a flat bottom surface 104. Projection 100 is adapted to engage the outer, inclined surface of projection 30 (FIG. 8) on base 12 when cover 18 is lowered into position on base 12 in covering relationship to the disks 16 mounted on post 14. As projection 100 engages projection 30, projection 100 is caused to flex or yield outwardly into the dashed line position of FIG. 8 while remaining in sliding engagement with projection 30. Thus, since the material of cover 18 is plastic, projection 100 will be resilient and will remain in sealing engagement with projection 30 when the cover is in its closed position as shown in FIGS. 1 and 7. In such a position, the lower surface 104 of flange 102 will engage the upper surface 36 of flange 34. Thus, the interior of holder 10 will be effectively sealed to protect against the entrance of dust or other particles into the holder. When the cover is removed from base 12, projection 100 will move out of engagement with projection 30 and will assume the position thereof shown in FIG. 8.

In use, cover 18 will normally be removed from base 12 and post 14 will then be able to receive one or more disks 16 thereon. After each disk is placed on the post, a spacer 39 is moved in the position onto the post above a respective disk. FIG. 1 shows only four disks 16 in place on post 14; whereas, FIG. 7 shows a maximum number of disks 16 on the post.

After the desired number of disks 16 are in place on the post, a spacer 39 may be placed on the post following which nut 20 is moved onto the post with projections 54 of the nut received in recesses 44, 46 and 48 as shown in FIG. 2. Then, the nut is rotated in a clockwise sense through an angle of 30° to 95° causing projections 54 to engage respective segments 38, 40 and 42 aligned with projections 54. After this occurs, the nut is locked to the post. Then, cover 18 is placed over the disks until the lower, outer peripheral margin of the cover is in sealing relationship to the outer peripheral margin of base 12 in the manner shown in FIG. 7. In the closed position of cover 18, projection 100 will be flexed outwardly by projection 30 so that the junction between the adjacent, engaging margins of base 12 and cover 18 will be sealed. Screw 88 will be threaded into hole 86 to secure the cover to base 12.

After the cover is secured in place, holder 10 can be moved from place to place or stored. When the cover is to be removed from base 12 screw 88 is rotated to release the cover from post 14, and the cover can then be removed, following which nut 20 is rotated in the opposite direction i.e., in a counterclockwise sense when viewing FIG. 2, thereby allowing the projections 54 to move back into alignment (FIG. 2) with recesses 44, 46 and 48. Then, the nut is lifted off the post and access can then be had to the disks 16 on the post.

All of the component parts of holder 10 are preferably molded from lightweight plastic materials which are abrasion resistant. In this way, holder 10 is relatively lightweight and rugged in construction. Since cover 18 is transparent, it is possible to see immediately that one or more disks are on the post. Also, by looking at the indicia on surface portion 50 of post 14, an observer can tell immediately how many disks are on the post.

What is claimed is:
1. A holder for magnetic disks comprising:
    a base having a central post secured thereto and extending upwardly therefrom, the post adapted to receive and to permit stacking a number of magnetic disks thereon in generally parallel, horizontal planes; and
    a cover movable into an operable position over the post and into covering relationship to the disks and the post, the cover having a top portion and an outer peripheral wall portion extending downwardly from said top portion and terminating in a first peripheral sealing region,
    said base having an outer peripheral wall portion terminating in a second peripheral sealing region;
    each of said first and second peripheral sealing regions having an outer rim portion located for mutual engagement therebetween when the cover is in said operative position; and each of said first and second peripheral sealing regions having an integral annular projection spaced from and located inside the corresponding rim portion and having inclined surfaces positioned for mutual engagement when said cover is in said operative position, one of annular projections being resilient so that said resilient projection will flex to cause said mutual engagement and thereby provide a peripheral seal within the region of mutual engagement between the outer rim portions.
2. The invention of claim 1 further including a nut removably mounted on the post for up and down movement with respect thereto, the post and nut having screwthread means thereon for allowing rotation of the nut relative to the post through a finite angle when the nut is at any one of a number of axially spaced locations along the post to thereby lock the nut against the disks on the post to prevent movement of the disks relative to the post;
    the screwthread means on the post including a number of spaced sets of screwthread segments on the outer surface of the post, each pair of adjacent segments at each axial location on the post being separated by a space, said nut having a projection receivable in each recess, respectively, and movable into screwthreaded relationship to the adjacent segment on the post when the nut is rotated.
3. The invention of claim 1 wherein the post has a recess in the upper end thereof, and wherein said holder further includes a handle pivotably mounted on the upper end of the post and capable of being held in the recess when the handle is in a retracted position, said handle being capable of extending outwardly from the recess and of being grasped to permit carrying of the base and post when the cover is removed from the base.
4. The invention of claim 1 wherein the annular projection located in the first peripheral sealing region is yieldable.
5. The invention of claim 1 wherein the rim portion of each of said first and second peripheral sealing regions terminates in a substantially flat surface below the free end of the corresponding annular projection so that the peripheral seal within the outer rim portions is located outside the plane of contact of said flat rim surfaces.

* * * * *